(No Model.)
J. L. ULLATHORNE.
POTATO PLANTER.
No. 307,508. Patented Nov. 4, 1884.
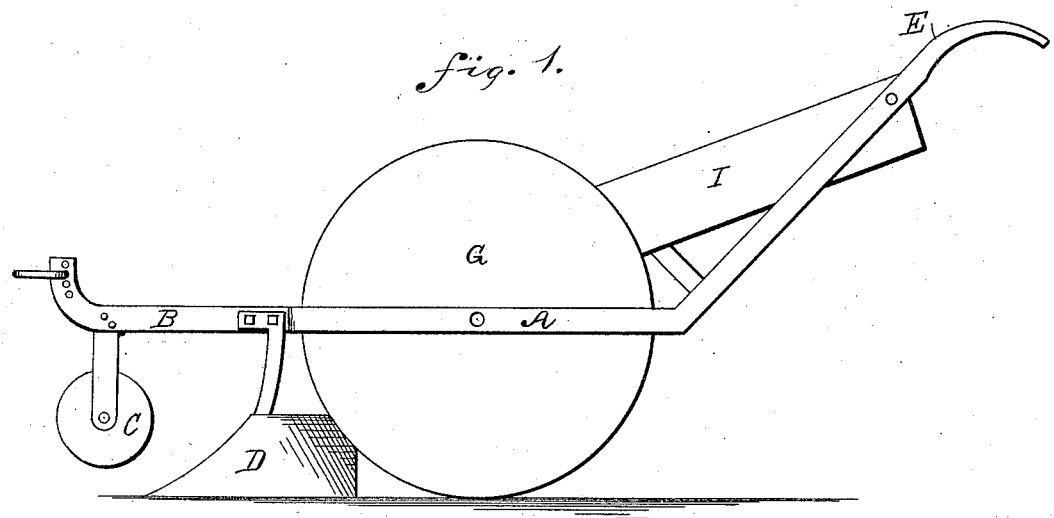
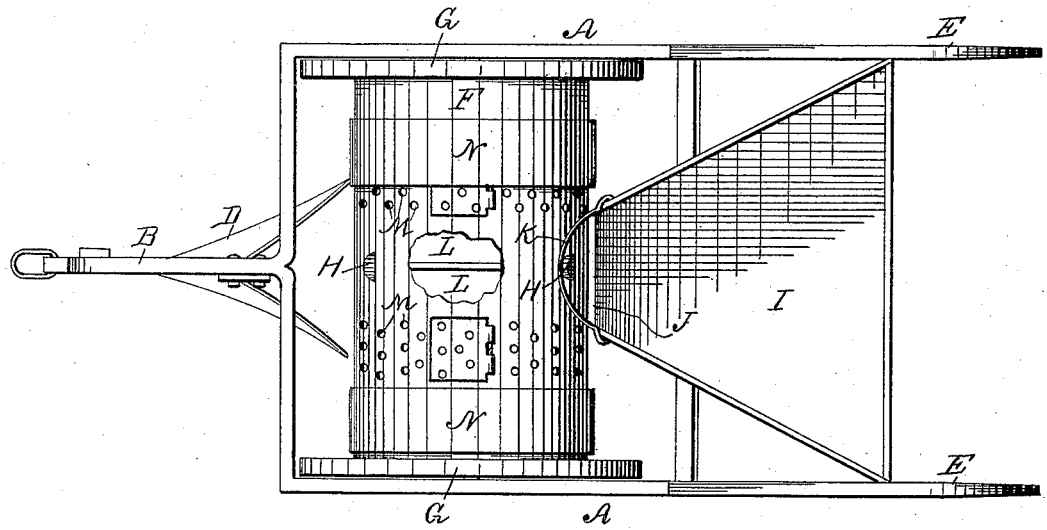
WITNESSES:
H. B. Brown
A. G. Lyne
INVENTOR:
Joc. L. Ullathorne
BY Munn & Co
ATTORNEYS.

UNITED STATES PATENT OFFICE.

JOSEPH L. ULLATHORNE, OF MEMPHIS, TENNESSEE.

POTATO-PLANTER.

SPECIFICATION forming part of Letters Patent No. 307,508, dated November 4, 1884.

Application filed January 23, 1884. (No model.)

*To all whom it may concern:*

Be it known that I, JOSEPH LILLIE ULLATHORNE, of Memphis, in the county of Shelby and State of Tennessee, have invented a new and useful Improvement in Potato-Planters, of which the following is a full, clear, and exact description, reference being had to the annexed drawings, forming part of this specification.

This invention consists of the novel construction hereinafter described and claimed.

In the drawings, Figure 1 is a side elevation, and Fig. 2 is a plan view, partly broken away, of my improved potato-planter.

A indicates a frame-work having the beam B, carrying a gage-wheel, C, and opening-plow D, and handles E. Within the frame is journaled a drum, F, having circular flanges or wheels G secured to its ends, by which it is supported on the ground and made to rotate as the planter moves forward. In the periphery of the drum, at its transverse center, are formed a series of cups or depressions, H, which are adapted to catch up potatoes from the open-sided hopper I at the rear and carry them up and over the drum to the furrow. The hopper I, which has the form of an open tray having two of its sides converging toward each other at the front, is supported on the handles E in an inclined position, so that the periphery of the drum shall form a support for the potatoes, which are fed through the narrow open side J of the hopper. K is a scraper for brushing off any excess of potatoes from the cups.

The above constitutes my improved potato-planter proper, and it may be variously modified without departing from the spirit of my invention so long as the drum and the open-sided hopper arranged behind it are employed.

Where fertilizer is to be distributed in the furrow at the time of planting the potatoes I form the drum with two interior end chambers, L L, and form perforations M in its periphery at opposite sides of the series of cups H. As the drum rotates the fertilizer will be sifted through the perforations M, and will roll into the furrow with the soil to cover the potatoes. For regulating the discharge of fertilizer, adjustable bands N are arranged on the outside of the drum in the usual manner.

What I claim is—

The potato-planter consisting of the frame A, the rolling drum having wheels G, cups H, chambers L L, perforations M, and bands N, the hopper I, supported behind the drum, and the plow D, substantially as shown and described.

JOSEPH L. ULLATHORNE.

Witnesses:
J. B. CONAWAY,
WM. CLIFFORD TILLER.